United States Patent [19]
Miles et al.

[11] Patent Number: 6,045,141
[45] Date of Patent: *Apr. 4, 2000

[54] MOLDED CHUCK

[75] Inventors: Kevin C. Miles, Clemson, S.C.; Ian Middleton, Chesterfield, United Kingdom

[73] Assignee: Power Tool Holders, Inc., Wilmington, Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/907,320

[22] Filed: Aug. 6, 1997

[51] Int. Cl.⁷ ....................................................... B23B 5/22
[52] U.S. Cl. .................................................. 279/62; 279/60
[58] Field of Search ......................................... 279/62, 60

[56] References Cited

U.S. PATENT DOCUMENTS

| | | |
|---|---|---|
| 262,771 | 8/1882 | Hoague . |
| 282,015 | 7/1883 | Todd . |
| 549,837 | 11/1895 | Weir . |
| 553,531 | 1/1896 | Long . |
| 558,242 | 4/1896 | Weir . |
| 562,421 | 6/1896 | Richards . |
| 1,043,114 | 11/1912 | Kupke . |
| 2,550,871 | 5/1951 | Sharp . |
| 3,237,955 | 3/1966 | McCarthy et al. . |
| 3,325,166 | 6/1967 | McCarthy et al. . |
| 3,545,776 | 12/1970 | Haviland . |
| 3,582,097 | 6/1971 | Elliott, Jr. . |
| 3,610,641 | 10/1971 | Ryder . |
| 3,910,589 | 10/1975 | Derbyshire . |
| 4,170,366 | 10/1979 | Alessio . |
| 4,213,623 | 7/1980 | Rohm . |
| 4,395,170 | 7/1983 | Clarey . |
| 4,527,809 | 7/1985 | Umbert . |
| 5,195,760 | 3/1993 | Wheeler et al. . |
| 5,452,906 | 9/1995 | Huff et al. ................................ 279/62 |
| 5,553,873 | 9/1996 | Salpaka et al. ........................... 279/62 |
| 5,704,616 | 1/1998 | Huff et al. ................................ 279/62 |
| 5,709,392 | 1/1998 | Barton et al. ............................. 279/62 |
| 5,741,016 | 4/1998 | Barton et al. ............................. 279/62 |

FOREIGN PATENT DOCUMENTS

| | | |
|---|---|---|
| B23B3104 | 7/1986 | Germany . |
| 362231 | 12/1949 | Japan . |
| 6299007 | of 1987 | Japan . |
| 164059 | 5/1921 | United Kingdom . |
| 2041798 | 2/1979 | United Kingdom . |

*Primary Examiner*—Andrea L. Pitts
*Assistant Examiner*—Monica Smith
*Attorney, Agent, or Firm*—Nelson Mullins Riley & Scarborough

[57] ABSTRACT

A molded chuck for a hand or powered driver including oblique jaws movable by rotation of a threaded nut engaged therewith to selectively clamp and release a tool.

50 Claims, 10 Drawing Sheets

MOLDED CHUCK

BACKGROUND OF THE INVENTION

The present invention relates generally to chucks for use with drills or with electric or pneumatic power drivers. Both hand and electric or pneumatic tool drivers are well known. Although twist drills are the most common tools used with such drivers, the tools may also comprise screwdrivers, nut drivers, burrs, mounted grinding stones and other cutting or abrading tools. Since the tools may have shanks of varying diameter or the cross-section of the tool shank may be polygonal, the device is usually provided with a chuck which is adjustable over a relatively wide range. The chuck may be attached to the driver by a threaded or tapered bore.

A wide variety of chucks have been developed in the art. In one form of chuck, three jaws spaced circumferentially, approximately 120 degrees apart from each other, are constrained by angularly disposed passageways in a body attached onto the drive shaft and configured so that rotation of the body in one direction relative to a constrained nut engaging the jaws forces the jaws into gripping relationship with respect to the shank of a tool, while rotation in the opposite direction releases the gripping relationship. Such a chuck may be keyless if it is rotated by hand. One example of such a chuck is disclosed in U.S. Pat. Nos. 5,125,673 entitled "Non-Impact Keyless Chuck" and 5,501,473 entitled "Chuck", both commonly assigned to the present assignee, and whose entire disclosure is incorporated by reference herein.

While many currently existing chuck designs have been successful, varying configurations are desirable for a variety of applications. Particularly, it would be desirable to have a chuck that could be manufactured with adequate performance for a lower cost than many currently existing chuck designs. For example, typically, the main body of a chuck of the type described in the above-referenced patents is manufactured from metal bar stock. Therefore, the greatest diameter of the chuck body at any point determines the diameter of the bar stock necessary to construct such body. Since bar stock is an expensive component of the chuck, design efforts have been made to minimize the diameter necessary to construct the chuck body which has typically necessitated use of separate thrust washers to receive the axial rearward thrust of the nut as well as separate rear sleeve members attached to the rearward section of the main body in chucks utilizing both front and rear sleeves. In addition, it is necessary to utilize secondary operations to place the oblique jaw passageways in the body and to create the main tool receiving bore. The most common way of forming these passageways and bores is through a drilling operation which necessitates the utilization of primarily round passageways and bores.

SUMMARY OF THE INVENTION

The present invention recognizes and addresses the foregoing considerations, and others of prior art constructions and methods.

Accordingly, it is an object of the present invention to provide an improved chuck.

It is another object of the present invention to provide a chuck that can be manufactured and assembled in a cost effective manner.

It is another object of the present invention to provide a keyless chuck that has a minimum number of individual components that must be assembled.

It is another object of some embodiments of the present invention to provide a chuck that minimizes or eliminates the constraints necessitated by use of bar stock for the main body.

It is another object of the present invention to provide an improved chuck whose main body can be molded.

It is a further object of certain embodiments of the present invention to provide an improved chuck that can be manufactured with a minimum number of operational steps.

These and other objects are achieved by providing a chuck for use with a manual or powered driver having a rotatable drive shaft, the chuck including an integrally molded body member with a nose section and a tail section, the nose section having an axial bore formed therein, and a plurality of angularly disposed passageways formed therethrough and intersecting the axial bore. A plurality of jaws are slidably positioned in the angularly disposed passageways. Each jaw has a jaw face formed on one side and threads formed on an opposite surface. A nut is rotatably mounted on the body member in engagement with the threads on the jaws, and a sleeve member is provided in driving engagement with the nut whereby when the sleeve is rotated with respect to the body, the jaws will be moved thereby.

These and other objects are further accomplished by providing a chuck for use with a hand or powered driver having a rotatable drive shaft, the chuck including an integrally molded body member having a nose section and a tail section. The nose section has an axial bore formed therein and a plurality of angularly disposed passageways formed therethrough and intersecting the axial bore. The nose section has a reinforcing member co-molded therewith about at least a portion of its outer circumference. A plurality of jaws are provided slidably positioned in the angularly disposed passageways, each of the jaws having a tool engaging face formed on one side thereof and threads formed on an opposite outer surface. A nut is provided mounted on the body member in engagement with threads on the jaws, and a sleeve member is provided in driving engagement with the nut whereby when the sleeve is rotated with respect to the body, the jaws will be moved thereby.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Figure 1A:
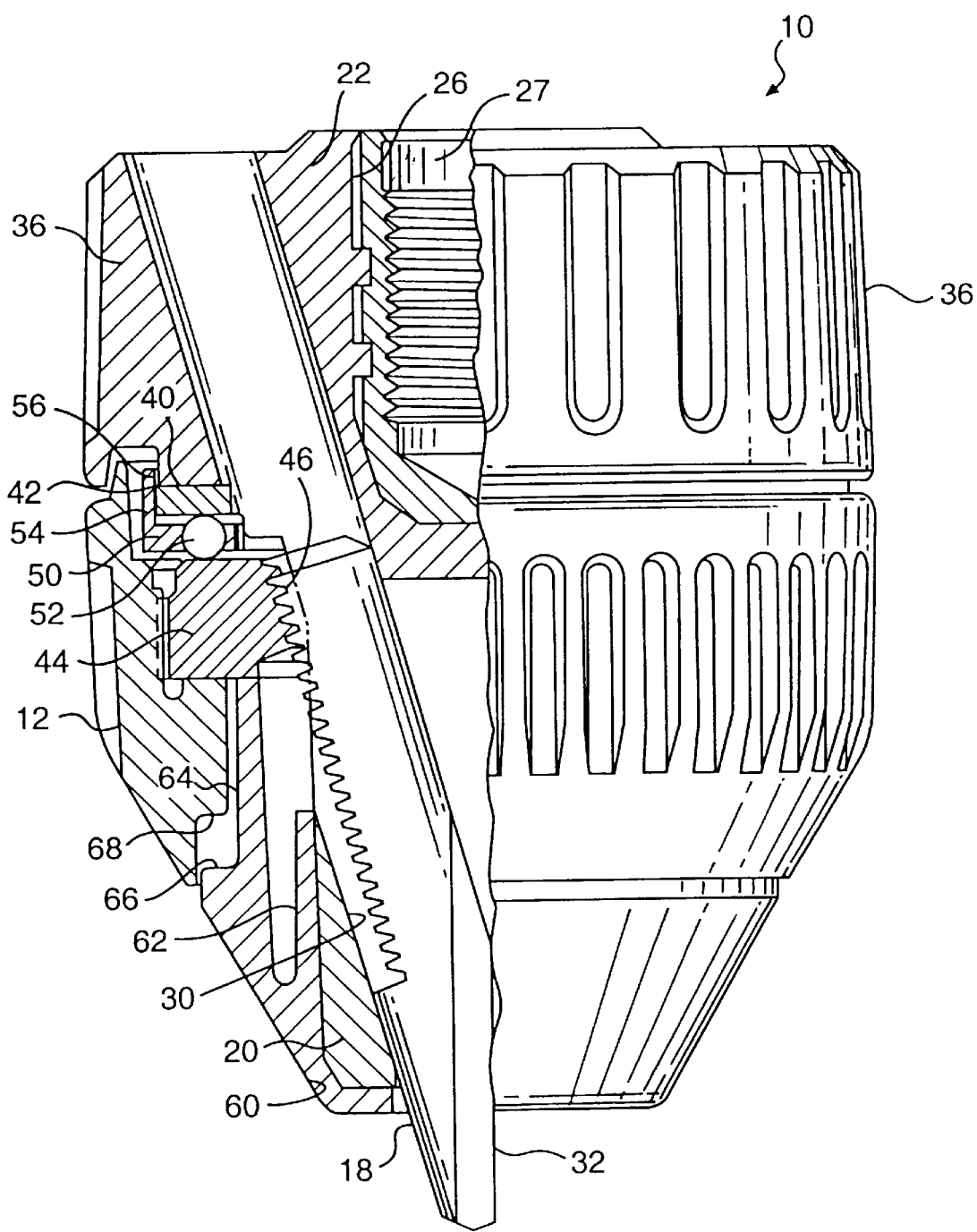
FIG. 1A is a longitudinal view, partly in section, of a chuck in accordance with an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Figure 1B:
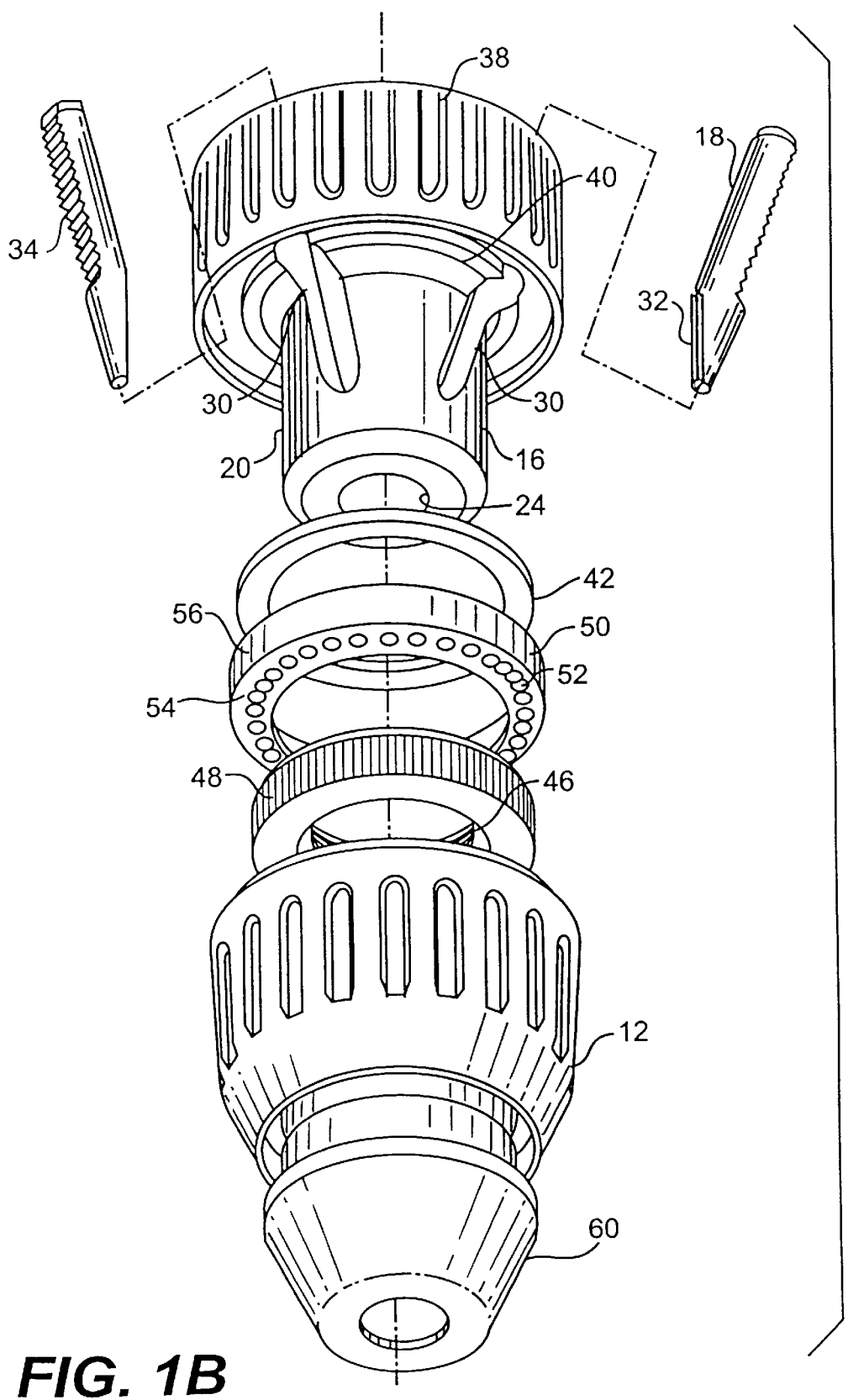
FIG. 1B is an exploded view of the chuck illustrated in FIG. 1A.

Referring to FIGS. 1A and 1B, a chuck in accordance with an embodiment of the present invention is illustrated. Chuck 10 includes a front sleeve member 12, a body member 16 and jaws 18. Body member 16 has a generally cylindrical nose or forward section 20 and a rear or tail section 22 that will be described in more detail below. An axial bore 24 is formed in nose section 20 of body member 16. Axial bore 24 is somewhat larger than the largest tool shank that the chuck is designed to accommodate. A bore 26 is formed in tail section 22 of body member 16 and may be formed with integral threads or may be affixed to a threaded insert member 27, either of which is adapted to mate with the drive shaft of a powered or hand driver (not shown). In addition to a bore 26, a threaded bore, or threaded insert 27, it should be appreciated that such bore configuration could be replaced with a tapered bore to mate with a tapered drive shaft or otherwise configured in any suitable manner to mate with the drive shaft of a powered or hand driver.

Passageways 30 are formed in body member 16 to accommodate each jaw 18. In a preferred embodiment, three jaws 18 are employed, and each jaw 18 is separated from the adjacent jaw by an arc of approximately 120 degrees. The axes of the passageways 30 and the jaws 18 are angled with respect to the chuck axis but intersect the chuck axis at a common point. Each jaw 18 has a tool engaging face or edge 32 which is generally parallel to the axis of the chuck body 16, and threads 34 on its opposite and outer surface. Threads 34 of any suitable type and pitch may be utilized within the scope of the present invention as would be readily apparent to one skilled in the art.

Figure 6:
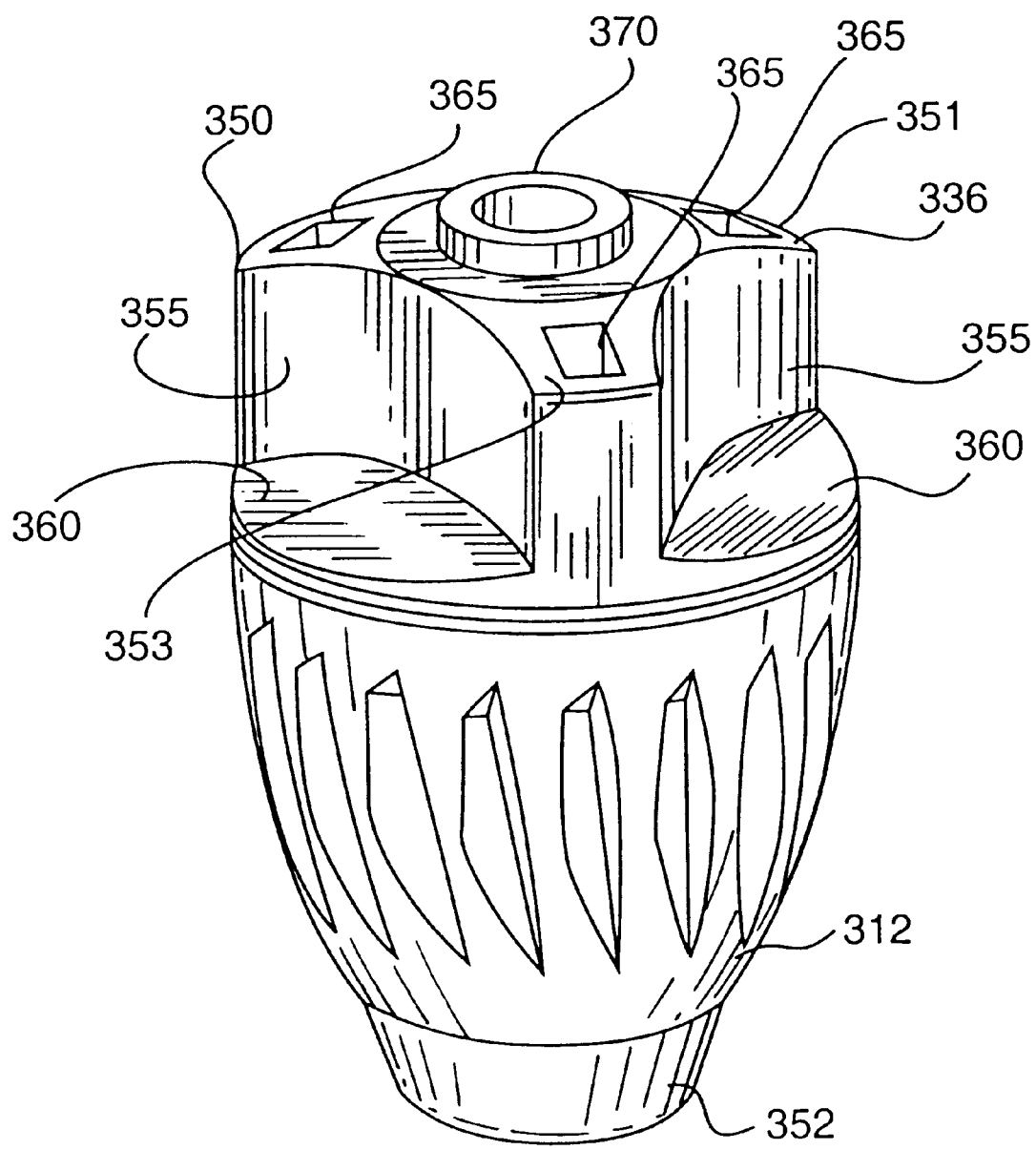
FIG. 6 is a perspective view of a chuck in accordance with another embodiment of the present invention.
Figure 7:
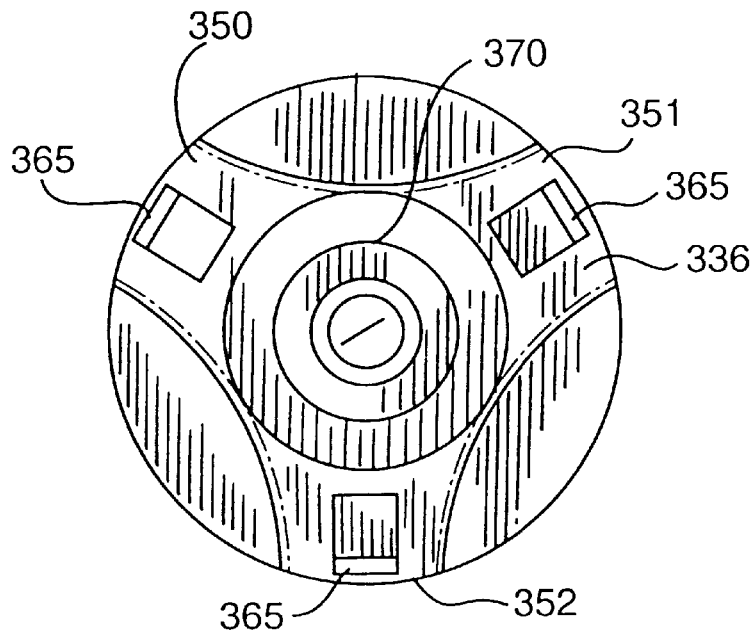
FIG. 7 is a rear view of the chuck of the embodiment of FIG. 6.
Figure 8:
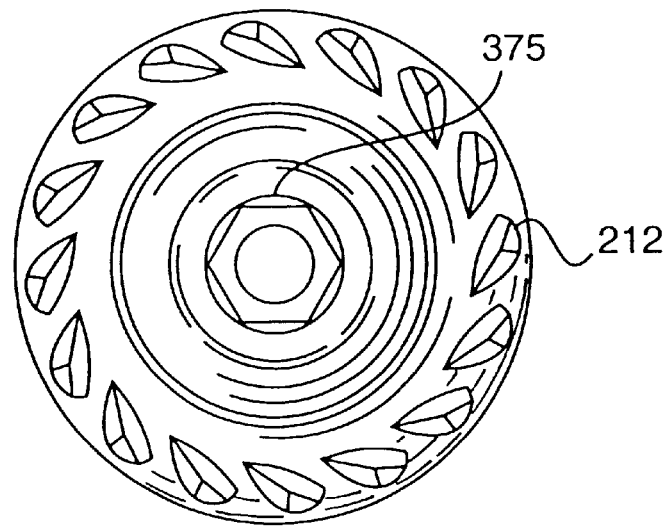
FIG. 8 is a front view of the chuck of the embodiment of FIG. 6.

Body member 16 includes an integral enlarged diameter portion 36 at its tail section which includes a gripping surface 38 about its outer circumference to allow body member 16 to be held stationary by virtue of the operator grasping this gripping surface. In one preferred embodiment, enlarged diameter portion 36 presents an outer surface of approximately the same diameter as the front sleeve 12. In one preferred embodiment, passageways 30 and bore 24 are integrally molded into chuck body 16. In other embodiments, the enlarged diameter surface could present a multi-lobal outer circumference, as illustrated in the embodiment of FIGS. 6–8, or a continuous outer circumference.

Integral enlarged diameter portion 36 forms a ledge 40 for transmitting rearward axial thrust to the body that is generated when tightening the chuck. A thrust ring member 42 is received about body member 16 as illustrated in FIG. 1A and rests on ledge 40. Thrust ring member 42 forms a bearing race which supports bearings as will be described in more detail below.

The present invention further includes a nut 44 which, in a preferred embodiment, is a unitary nut and includes threads 46 for mating with threads 34 on jaws 18 whereby when said nut is rotated with respect to said body, the jaws will be advanced or retracted. In a preferred embodiment, nut 44 includes a knurled or ridged surface 48 to enhance the interconnection between the nut and a front sleeve received thereover.

A bearing assembly 50 is adapted to be placed between thrust ring member 42 and nut 44. Bearing assembly 50 includes bearing members 52 which, in a preferred embodiment, may be ball bearings or roller bearings and a cage 54. Cage 54 includes a lip 56 extending perpendicular to the primary cage portion 58. Bearing assembly 50 with lip 56 is configured so that lip 56 is received about the outer circumference of thrust ring member 42 when in place to maintain bearing assembly 50 in its proper location.

Front sleeve member 12 is adapted to be press fitted onto nut 44 and extends over at least a portion of nose section 20 of body member 16. A reinforcing member 60 is received over the forwardmost portion of body member 16 and serves as both a nosepiece to protect the forwardmost portion of the body and a reinforcing member to strengthen body member 16 in the nose section. Reinforcing member 60 includes a first circumferential leg 62 which extends substantially the distance between the forwardmost portion of body member 16 to the location where the jaw holes open through the outer circumference of the nose section 20. This reinforcing leg serves to provide additional support to the body in the area between the jaw passageways and the forwardmost section of the body member 16. Reinforcing member 60 also includes a second circumferential leg 64 which extends toward nut 44 into a position to prevent nut 44 from disengaging threads 34 by excessive movement in the direction of the forwardmost portion of the nose section. Reinforcing member 60 also includes a ledge 66 extending circumferentially around reinforcing member 60 and configured to engage ledge 68 of sleeve 12 should sleeve 12 become disengaged from nut 44. The relationship between ledges 66 and 68 is such that sleeve 12 cannot move over reinforcing member 60, which arrangement provides a secondary retaining mechanism for sleeve 12. In a preferred embodiment, reinforcing member 60 is press fitted over the nose section of body member 16 and provides additional hoop strength in that location, but it should be appreciated that it could be affixed in any suitable way. In addition to the above, reinforcing member is exposed when chuck 10 is assembled and may preferably be constructed from low carbon steel and coated or plated with a non-ferrous metallic coating to prevent rust and to enhance its appearance. In a preferred embodiment, such coating may be zinc or nickel, however, it should be appreciated that any suitable coating could be utilized, and any suitable material or process could be utilized to produce the reinforcing member.

While an integral enlarged diameter portion 36 is illustrated with the rear or tail section of the chuck of the embodiment of FIGS. 1A and 1B, it should be appreciated that this section could be of reduced diameter and sleeve 12 extended to the rearmost portion of the chuck. This alternative would be feasible when a spindle lock or the like is provided on the driver or when the driver is used to tighten or loosen the jaws.

The circumferential surface of front sleeve member 12 may be knurled or may be provided with longitudinal ribs or other protrusions to enable the operator to grip it securely. As stated above, the outer surface of the integral enlarged diameter portion 36 may be likewise configured. The front sleeve may be fabricated from a structural plastic such as polycarbonate, a filled polypropylene, for example, glass-filled polypropylene, or a blend of structural plastics. Other composite materials such as, for example, graphite filled polymerics would also be suitable in certain environments. As would be appreciated by one skilled in the art, the materials from which the sleeve of the present invention is fabricated will depend on the end use of the chuck, and the above are provided by way of example only.

It will be appreciated that the integral enlarged diameter portion 36 is a part of body member 16 while front sleeve member 12 is operatively associated with nut 44 and secured with respect to body member 16 to allow for relative rotation therewith. Relative movement of the front sleeve 12 and integral enlarged diameter portion 36, due to the interaction between threads 34 on jaws 18 and threads 46 on nut 44, causes jaws 18 to be advanced or retracted depending on the direction of relative movement.

An important aspect of the present invention is that body member 16 is an integrally molded unit which can, depending on the desired configuration, include integrally molding the enlarged diameter portion, the passageways 30, and bore 24. Such molding of one or more of these components eliminates problems associated with minimizing bar stock diameters as well as the necessity of further processing steps such as drilling passageways and bores for receipt of the tool and jaws. It should be appreciated, however, that it is within the scope of the present invention to mold body member 16 without certain components discussed above and to use further processing steps to complete the chuck body such as, for example, drilling jaw passageways.

In a preferred embodiment, the body member 16 may be formed from a structural plastic, such as polycarbonate, a filled polypropylene, for example, glass-filled polypropylene, or a blend of structural plastic materials. Other composite materials such as, for example, graphite-filled polymerics would also be suitable in certain environments. At least regarding use of a plastic material, injection molding would appear to be the preferred method. In addition, the chuck body 16 could be molded from a suitable metal, or other process or material such as zinc die casted.

It should be appreciated that molding body member 16, as opposed to utilizing various machining operations requiring the drilling of passageways and bores, would allow bore 24 as well as passageways 30 to have non-circular cross-sectional configurations. This would allow, for example, jaws to be manufactured with non-circular configurations including cross-sectional configurations that are rectangular, triangular, trapezoidal or any other suitable configuration.

It should be appreciated that while a one-piece nut is illustrated with a press-fitted sleeve, any known configuration of nut and/or sleeve relationships could be utilized such as, for example, a two-piece nut and/or a drive lug engaging relationship between sleeve member 12 and nut 44. Examples of such other arrangements are illustrated in the patents referenced above and incorporated herein in their entirety.

Figure 2A:
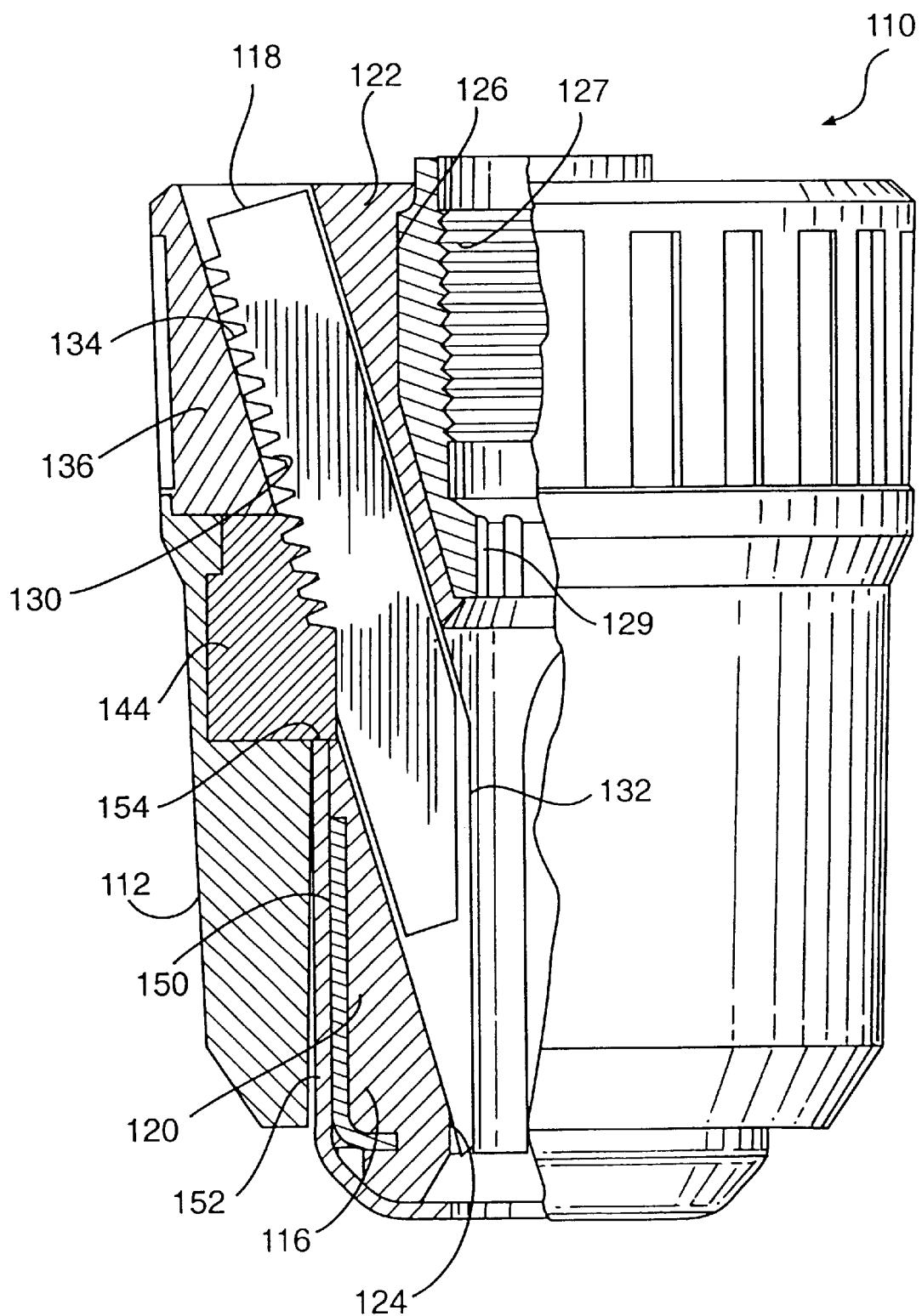
FIG. 2A is a longitudinal view, partly in section, of a chuck in accordance with another embodiment of the present invention.
Figure 2B:
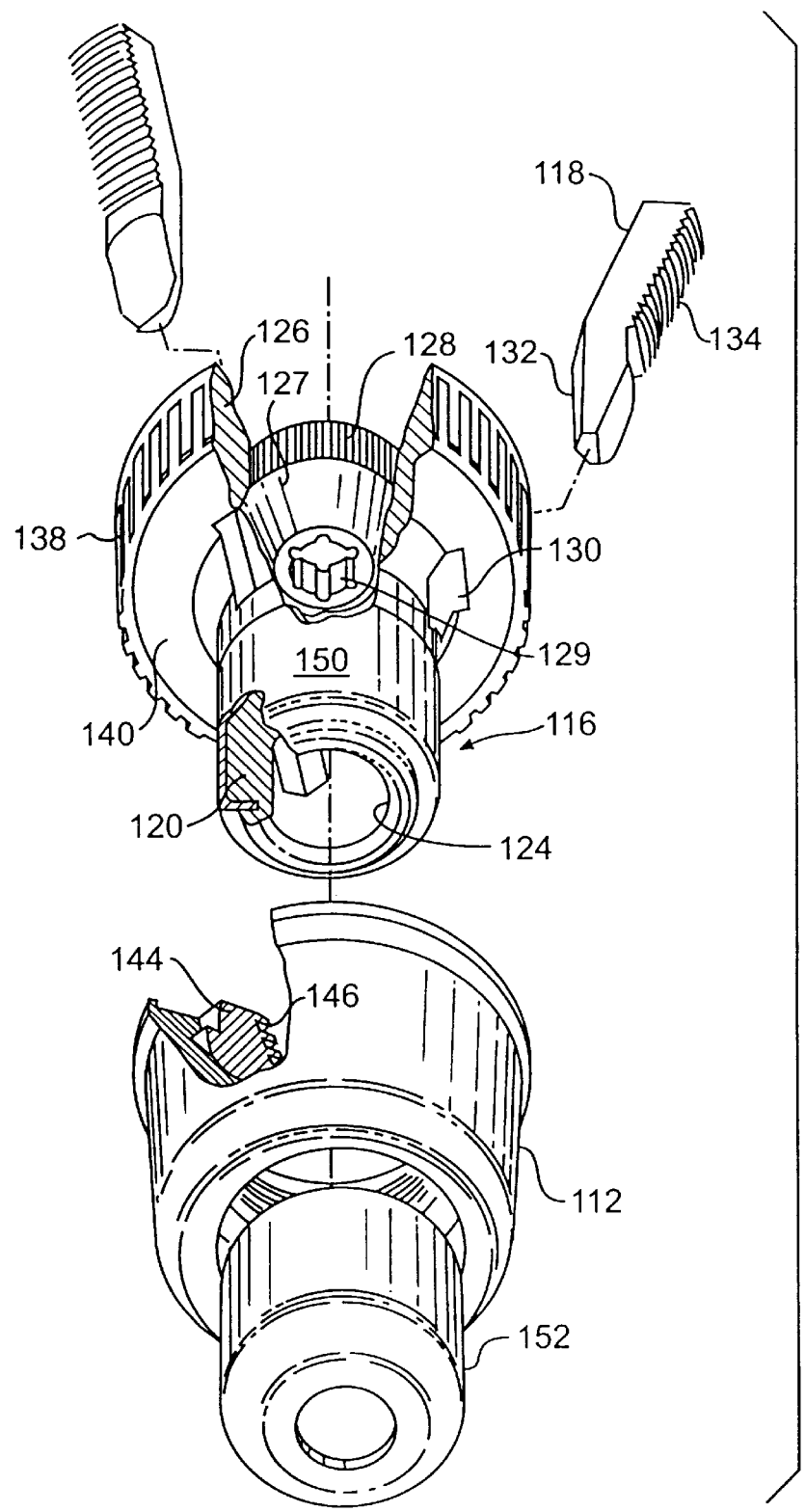
FIG. 2B is an exploded view of the chuck of the embodiment of FIG. 2A.

Referring to FIGS. 2A and 2B, a chuck 110 in accordance with another embodiment of the present invention is illustrated. Chuck 110 includes a front sleeve member 112, a body member 116, and jaws 118. Body member 116 has a generally cylindrical nose or forward section 120 and a rear or tail section 122 that will be described in more detail below. An axial bore 124 is formed in nose section 120 of body member 116. Axial bore 124 is somewhat larger than the largest tool shank that the chuck is designed to accommodate. A bore 126 is formed in tail section 122 of body member 116 and may be formed with integral threads or may be affixed to a threaded insert member 127, either of which is adapted to mate with the drive shaft of a powered or hand driver (not shown). A portion of the outer circumference of insert member 127 may be knurled as illustrated at 128 or otherwise configured to provide a secure engagement with tail section 122 of body member 116. For example, it could be co-molded with the body or pressed therein. Insert 127 could be constructed of any suitable material including brass or other metal and may include a socket 129 for receipt of a mounting tool to drive the chuck onto the tool spindle for mounting the chuck in a manner set forth in commonly assigned U.S. Pat. No. 5,193,824, the disclosure of which is incorporated by reference herein in its entirety.

In addition to a bore 126 or threaded insert 127, it should be appreciated that such bore could be replaced with a tapered bore to mate with a tapered drive shaft or otherwise configured in any suitable manner to mate with the drive shaft of a powered or hand driver. Other configurations could also be suitable, such as a smooth bore to mate with a knurled or barbed spindle from the power driver. Further it is possible that the spindle of the powered or hand driver could be co-molded directly with the body member 116. It should also be appreciated that part or all of the internal configuration of bore 24, 124, 224, 324 could be non-circular, such as hexagonally shaped, for receipt of a tool therein for mounting of the chuck on a threaded drill spindle as described in more detail below.

Passageways 130 are formed in body member 116 to accommodate each jaw 118. In a preferred embodiment, three jaws 118 are employed, and each jaw 118 is separated from the adjacent jaw by an arc of approximately 120 degrees. The axes of the passageways 130 and the jaws 118 are angled with respect to the chuck axis but intersect the chuck axis at a common point. Each jaw 118 has a tool engaging face or edge 132 which is generally parallel to the axis of the chuck body 116, and threads 134 on its opposite and outer surface. Threads 134 of any suitable type and pitch may be utilized within the scope of the present invention as will be readily apparent to one skilled in the art.

Body member 116 includes an integral enlarged diameter portion 136 at its tail section which includes a gripping surface 138 about its outer circumference to allow body member 116 to be held stationary by virtue of an operator grasping this gripping surface. In one preferred embodiment, passageways 130 and bore 124 are integrally molded into chuck body 116.

Integral enlarged diameter portion 136 forms a ledge 140 for transmitting rearward axial thrust generated when tightening the chuck to the body.

The present invention further includes a nut 144 which, in a preferred embodiment, is a unitary nut and includes threads 146 for mating with threads 134 on jaws 118 whereby when said nut is rotated with respect to said body, the jaws will be advanced or retracted. In a preferred embodiment, nut 144 is co-molded with front sleeve 112 as will be described in more detail below.

Front sleeve member 112 is co-molded with nut 144 and extends over at least a portion of nose section 120 of body member 116. A reinforcing member 150 is co-molded about the outer circumference of at least a portion of forward section 120 of body member 116 to provide additional strength to that portion of body member 116. While co-molding is described, a press fit or other configuration could be utilized.

An extended nosepiece 152 is received over the forward-most portion of body member 116 and serves as both a nosepiece and a retaining member. Extended nosepiece 152 includes a nut engagement portion 154 that is adapted to maintain nut 144 in place during operation of the chuck. Since sleeve 112 and nut 144 are co-molded together, extended nosepiece 152 also maintains sleeve 112 in place through its engagement with nut 144. Extended nosepiece 152 is configured and adapted to extend to a point near where passageways 130 intersect axial bore 124. Nut engagement portion 154 is dimensioned and configured to prevent nut 144 from disengaging threads 134 by excessive movement in the direction of the forwardmost portion of the nose section. In addition to the above, extended nosepiece 152 is exposed when chuck 110 is assembled and may preferably be a metallic member such as steel and may be coated or plated with a non-ferrous metallic coating to prevent rust and to enhance its appearance. In a preferred embodiment, such coating may be zinc or nickel, however, it should be appreciated that any suitable coating could be utilized.

While an integral enlarged diameter portion 136 is illustrated with the rear or tail section of the chuck of the embodiment of FIGS. 2A and 2B, it should be appreciated that this section could be reduced in diameter and the sleeve 112 extended to the rearmost portion of the chuck. This alternative would be feasible when a spindle lock or the like is provided on the driver or when the driver is used to tighten or loosen the jaws.

The circumferential surface of front sleeve member 112 may be knurled or may be provided with longitudinal ribs or other protrusions to enable the operator to grip it securely. As stated above, the outer surface of the integral enlarged diameter portion 136 may likewise be configured. The front sleeve may be fabricated from a structural plastic such as polycarbonate, a filled polypropylene, for example, glass-filled polypropylene, or a blend of structural plastics. Other composite materials such as, for example, graphite-filled polymerics would also be suitable in certain environments. As would be appreciated by one skilled in the art, the materials from which the sleeve of the present invention is fabricated will depend on the end use of the chuck, and the above are provided by way of example only.

It will be appreciated that the integral enlarged diameter portion 136 is a part of body member 116, while front sleeve member 112 is operatively associated with nut 144 and secured with respect to body member 116 to allow for relative rotation therewith. Relative movement of the front sleeve 112 and integral enlarged diameter portion 136, due to the interaction between threads 134 on jaws 118 and threads 146 on nut 144, causes jaws 118 to be advanced or retracted dependent on the direction of relative movement.

An important aspect of the present invention is that body member 116 is an integral molded unit which can, depending on the desired configuration, include integrally molding the expanded circumferential portion, the passageways 130 and bore 120. Such molding of one or more of these components eliminates problems associated with minimizing bar stock diameters as well as further processing steps of drilling passageways and bores for receipt of the tool and jaws. It should be appreciated, however, that it is within the scope of the present invention to mold body member 116 without certain components discussed above and to use further processing steps to complete the chuck body such as, for example, drilling jaw passageways.

In a preferred embodiment, the body member 116 may be formed from a structural plastic, such as polycarbonate, a filled polypropylene, for example, glass-filled polypropylene, or a blend of structural plastic materials. Other composite materials such as, for example, graphite-filled polymerics, would also be suitable in certain environments. In addition, the chuck could be molded from a suitable metal or other process or material such as zinc die casted.

It should be appreciated that molding body member 116 as opposed to utilizing various machining operations requiring the drilling of passageways and bores, would allow bore 124 as well as passageways 130 to have non-circular cross-sectional configurations. This would allow, for example, jaws to be manufactured with non-circular configurations, including cross-sectional configurations that are rectangular, triangular, trapezoidal or any other suitable configuration. Jaws of a rectangular cross-sectional configuration are illustrated at 118 in FIG. 2B. Jaws 118 could be constructed in any known manner, but a presently preferred manner is utilization of powder metal. It should be appreciated that while a one-piece co-molded nut/sleeve arrangement is illustrated, any known configuration of nut and/or sleeve relationships could be utilized as set forth above.

Figure 3A:
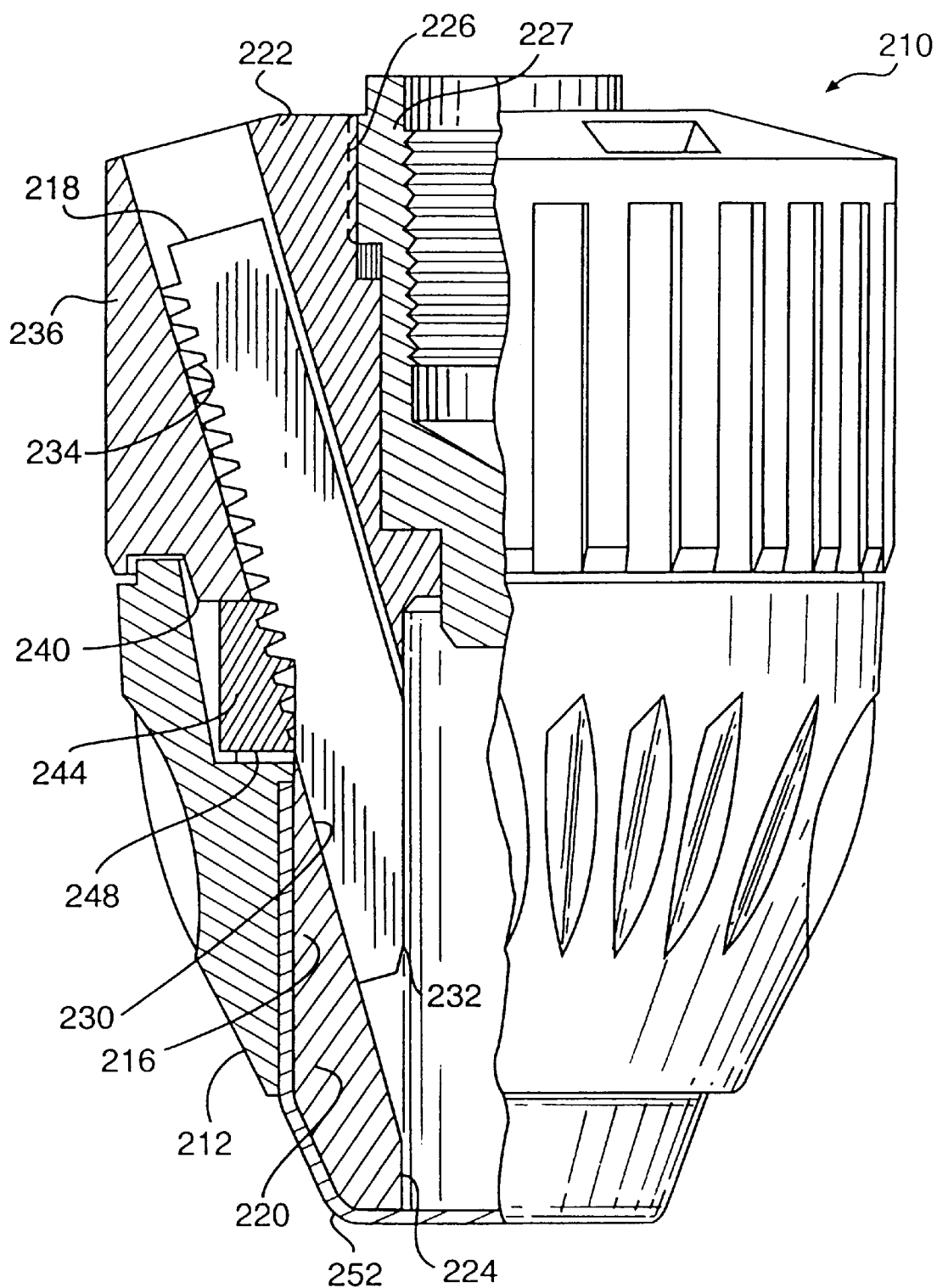
FIG. 3A is a longitudinal view, partly in section, of a chuck in accordance with another embodiment of the present invention.
Figure 3B:
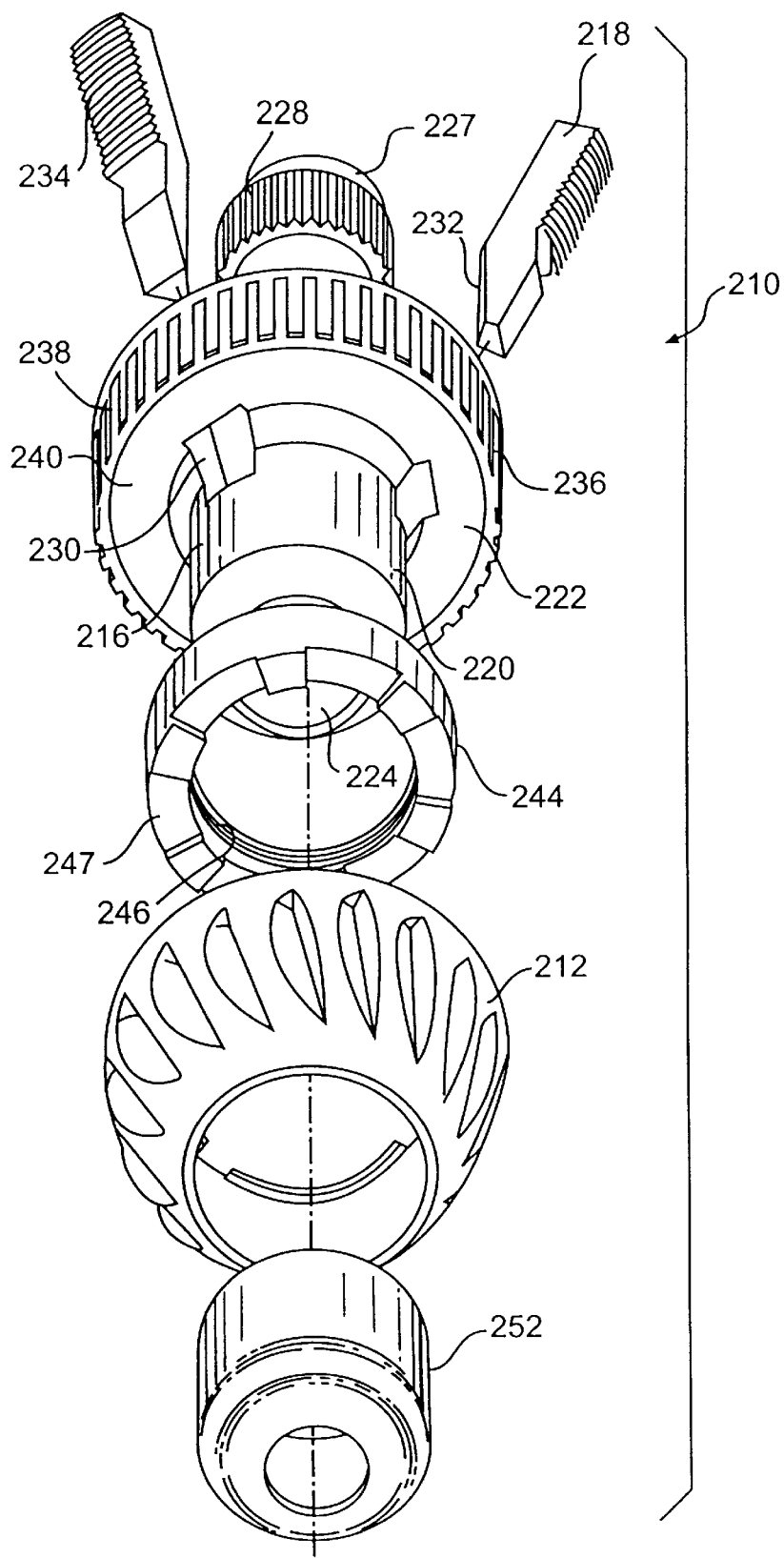
FIG. 3B is an exploded view of the chuck of the chuck of the embodiment illustrated in FIG. 3A.

Referring to FIGS. 3A and 3B, a chuck 210 in accordance with another embodiment of the present invention is illustrated. Chuck 210 includes a front sleeve member 212, a body member 216, and jaws 218. Body member 216 has a generally cylindrical nose or forward section 220 and a rear or tail section 222 that will be described in more detail below. An axial bore 224 is formed in nose section 220 of body member 216. Axial bore 224 is somewhat larger than the largest tool shank that the chuck is designed to accommodate. A bore 226 is formed in tail section 222 of body member 216 and may be formed with integral threads or may be affixed to a threaded insert member 227, either of which is adapted to mate with the drive shaft of a powered or hand driver (not shown). A portion 228 of the outer circumference of insert member 227 may be knurled or otherwise configured to provide a secure engagement with tail section 222 of body member 216. Insert 227 may include a mounting socket as set forth above for engagement with a rotatable tool for attaching the chuck to the spindle of a powered driver. While a bore 226 or threaded insert 227 are illustrated, it should be appreciated that such bore could be replaced with a tapered bore to mate with a tapered drive shaft or otherwise configured in any suitable manner to mate with the drive shaft of a powered or hand driver.

Passageways 230 are formed in body member 216 to accommodate each jaw 218. In a preferred embodiment, three jaws 218 are employed, and each jaw 218 is separated from the adjacent jaw by an arc of approximately 120 degrees. The axes of the passageways 230 and the jaws 218 are angled with respect to the chuck axis but intersect the chuck axis at a common point. Each jaw 218 has a tool engaging face 232 which is generally parallel to the axis of the chuck body 216, and threads 234 on its opposite and outer surface. Threads 234 of any suitable type and pitch may be utilized within the scope of the present invention as will be readily apparent to one skilled in the art.

Body member 216 includes an integral enlarged diameter portion 236 at its tail section which includes a gripping surface 238 about its outer circumference to allow body member 216 to be held stationary by virtue of an operator grasping this gripping surface. In one preferred embodiment, passageways 230 and bore 224 are integrally molded into chuck body 216. Integral enlarged diameter portion 236 forms a ledge 240 for transmitting rearward axial thrust generated when tightening the chuck to the body 216.

The present invention further includes a nut 244 which, in a preferred embodiment, is a unitary nut and includes threads 246 for mating with threads 234 on jaws 218 whereby when said nut is rotated with respect to said body, the jaws will be advanced or retracted. In a preferred embodiment, nut 244 includes drive lug receiving portions 247 for receiving drive lugs from front sleeve member 212 for rotational engagement as will be described in more detail below.

Front sleeve member 212 extends over at least a portion of nose section 220 of body member 216 and includes drive lugs 248 which are received in drive lug receiving portions 247 so that front sleeve 212 is rotationally coupled with nut 244.

An extended nosepiece 252 is received over the forward-most portion of body member 216 and serves to protect the forwardmost portion of body member 216 as well as reinforce the forward portion of body member 216. Extended nosepiece 252 extends from the forwardmost portion of the nose section to a position near the intersection of passageways 230 with bore 226. In addition to its protecting and reinforcing functions, extended nosepiece 252 also engages a portion of front sleeve 212 to maintain front sleeve 212 in rotational engagement with nut 244.

In addition, since extended nosepiece 252 is exposed when chuck 210 is assembled, it may be made of any suitable material and, if metal, such as stamped from a low carbon steel, may preferably be coated with a non-ferrous metallic coating to prevent rust and to enhance its appearance. In a preferred embodiment, such coating may be zinc or nickel, however, it should appreciated that any suitable coating could be utilized.

While an integral enlarged diameter portion 236 is illustrated with the rear or tail section of the chuck of the embodiment of FIGS. 3A and 3B, it should be appreciated that this section could be reduced in diameter, and the sleeve 212 extended to the rearmost portion of the chuck. This alternative would be feasible when a spindle lock or the like is provided on the driver or when the driver is used to tighten or loosen the jaws.

The circumferential surface of front sleeve member 212 may be knurled or may be provided with longitudinal ribs or other protrusions to enable the operator to grip it securely. As stated above, the outer surface of the integral enlarged diameter portion 236 may likewise be configured. The front sleeve may be fabricated from a structural plastic such as a polycarbonate, a filled polypropylene, for example, glass filled polypropylene, or a blend of structural plastics. Other composite materials such as, for example, graphite-filled polymerics would also be suitable in certain environments. As would be appreciated by one skilled in the art, the materials from which the sleeve of the present invention is fabricated will depend on the end use of the chuck, and the above are provided by way of example only.

It will be appreciated that the integral enlarged diameter portion 236 is a part of body member 216, while front sleeve member 212 is operatively associated with nut 244 and secured with respect to body member 216 to allow for relative rotation therewith. Relative movement of front sleeve 212 and integral enlarged diameter portion 236, due to the interaction between threads 234 on jaws 218 and threads 246 on nut 244, causes jaws 218 to be advanced or retracted dependent on the direction of relative movement.

An important aspect of the present invention is that body member 216 is an integral molded unit which can, depending on the desired configuration, include integrally molding the expanded circumferential portion, the passageways 230 and bore 220. Such molding of one or more of these components eliminates problems associated with minimizing bar stock diameters as well as further processing steps of drilling passageways in bores for receipt of the tool and jaws. It should be appreciated, however, that it is within the scope of the present invention to mold body member 216 without certain components discussed above and to use further processing steps to complete the chuck body as, for example, drilling jaw passageways.

In a preferred embodiment, the body member 216 may be formed from a structural plastic such as polycarbonate, a filled polypropylene, for example, glass-filled polypropylene, or a blend of structural plastic materials. Other composite materials such as, for example, graphite-filled polymerics, would also be suitable in some environments. In addition, the chuck could be molded from a suitable metal or other process or material such as zinc die casted.

Figure 5:
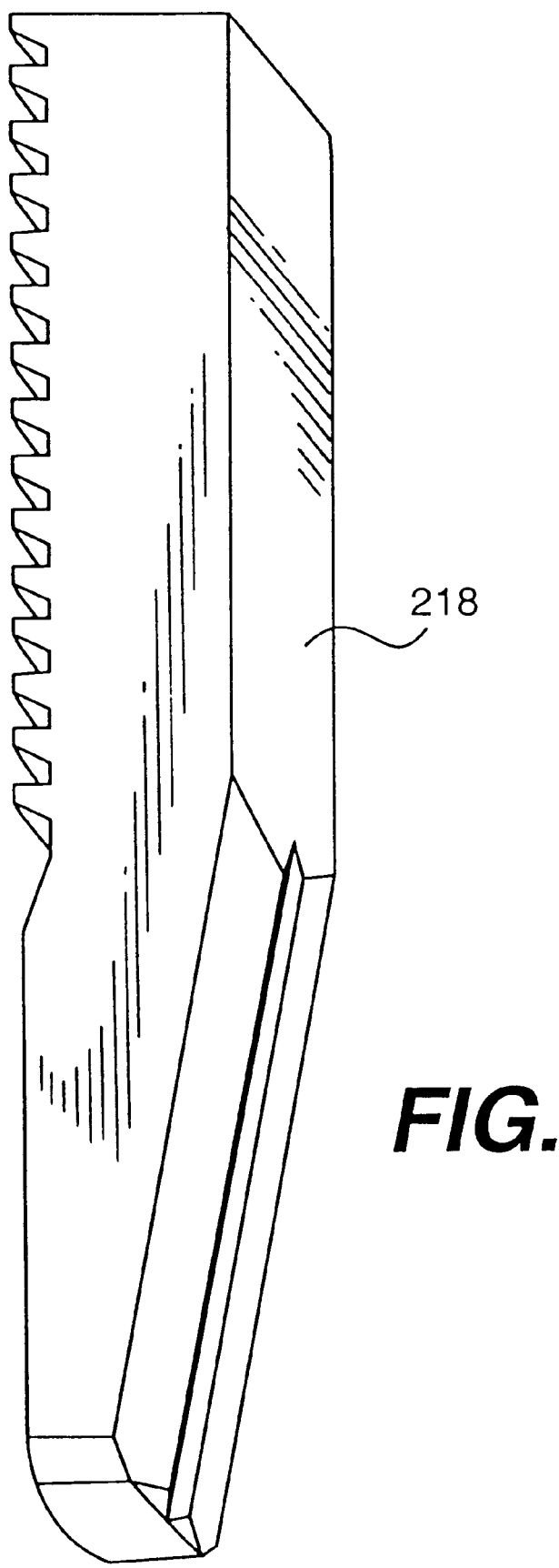
FIG. 5 is a perspective view of a jaw in accordance with an embodiment of the present invention.

It should be appreciated that molding body member 216, as opposed to utilizing various machining operations requiring the drilling of passageways and bores, would allow bore 224 as well as passageways 230 to have non-circular cross-sectional configurations. This would allow, for example, jaws to be manufactured with non-circular configurations including cross-sectional configurations that are rectangular, triangular, trapezoidal or any other suitable configuration. FIGS. 3B and 5 best illustrate the jaws with rectangular cross-sectional configuration. Jaws in accordance with the present embodiments may be constructed of any suitable material or process. It should be appreciated that while a one-piece nut with drive member arrangement is illustrated, any known configuration of nut and/or sleeve relationships could be utilized as set forth above.

Figure 4:
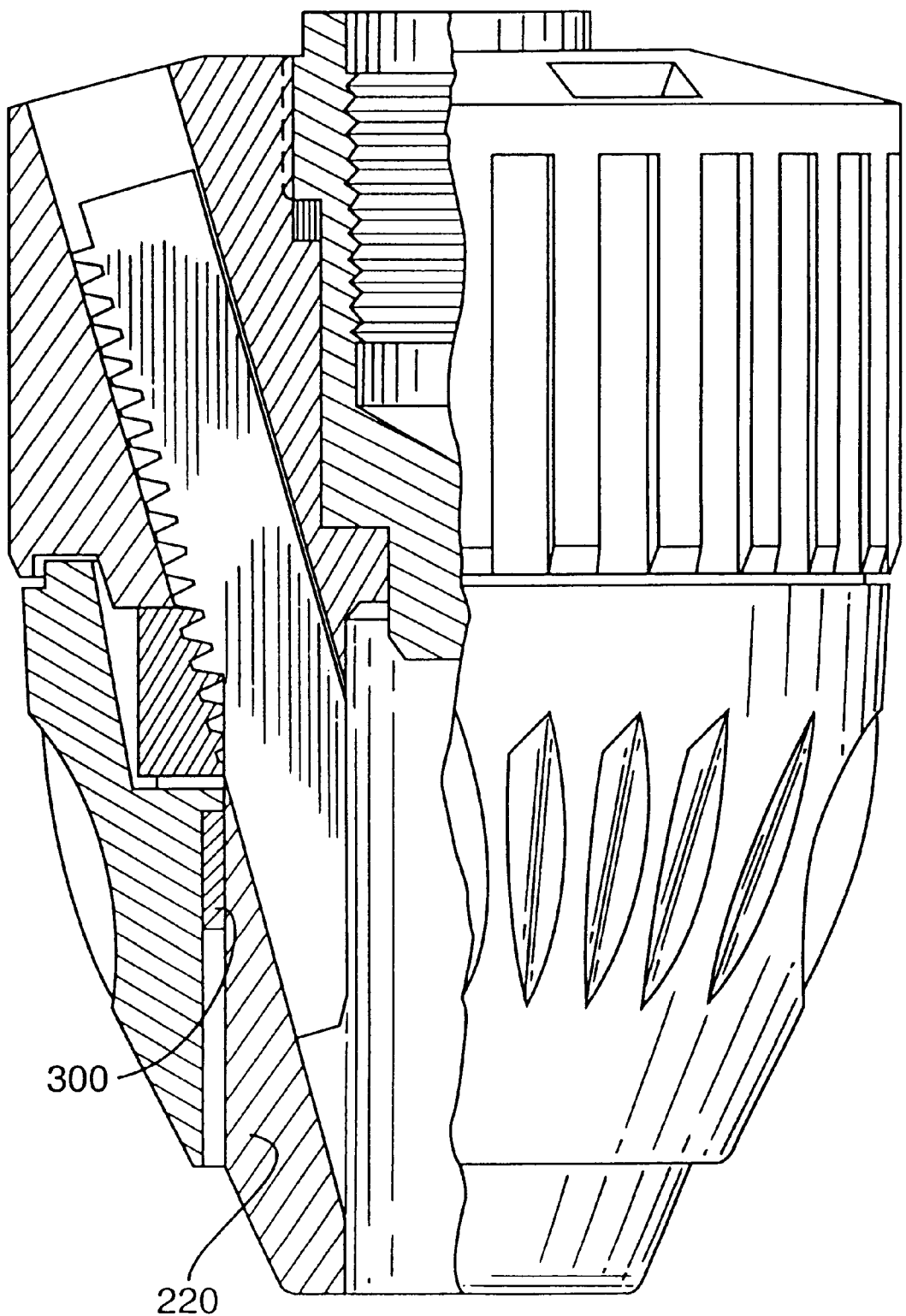
FIG. 4 is a longitudinal view, partly in section, of a chuck in accordance with another embodiment of the present invention.

Referring to FIG. 4, a chuck in accordance with another embodiment of the present invention is illustrated. The embodiment of FIG. 4 is the same as that of FIGS. 3A and 3B except nosepiece 252 of FIGS. 3A and 3B is replaced with a sleeve retention band 300. Sleeve retention band 300 retains the front sleeve in place but allows the forward portion of the chuck body member to be exposed. Sleeve 300 is pressed or otherwise retained on body 220. While a retaining band 300 is illustrated, any type of retaining member could be utilized to replace nosepiece 252 or band 300.

Referring to FIGS. 6–8, another embodiment of the present invention is illustrated, The operational mechanism of the embodiment of FIGS. 6–8 is the same as that of the embodiment of FIGS. 3A and 3B. Front sleeve 312 is rotatable with respect to the integral enlarged diameter portion 336. Integral enlarged diameter portion 336 is integral with the remainder of the chuck body which is as set forth with respect to FIGS. 3A and 3B. Sleeve 312 is retained in place by nosepiece 352, and sleeve 312 is operatively connected to a nut and jaws as set forth in FIGS. 3A and 3B.

In the embodiment of FIGS. 6–8, integral enlarged diameter portion 336 is of a multi-lobal configuration that provides a unique ornamental configuration as well as a unique gripping surface. Three lobes, 350, 351, 353, are illustrated with concave surfaces 355 interconnecting the lobes. A sloping surface 360 also interconnects the lobes 350, 351, 353. Each lobe has a jaw guideway 365 molded therein, and a threaded insert 370 is received in the center portion for mounting to a spindle. The internal bore of the nose section of the body member is formed with a non-circular configuration 375 for receipt of a tool therein for threadedly mounting the chuck on a spindle. This non-circular configuration could be for the entire length of the bore or a portion thereof. While a tri-lobal configuration is illustrated, it should be appreciated that any number of lobes would be within the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. For example, the multi-lobal configuration of FIGS. 6–8 could be utilized with any embodiment either as an integral portion or a separate sleeve. Furthermore, those of ordinary skill in the art will appreciate that the foregoing description is by way of example only, and is not intended to be limitative of the invention so further described in such appended claims.

What is claimed is:

1. A chuck for use with a manual or powered driver having a rotatable drive shaft, said chuck comprising:
   a) an integrally molded body member having a nose section and a tail section, said nose section having an axial bore formed therein and a plurality of angularly disposed passageways formed therethrough and intersecting said axial bore;
   b) a plurality of jaws slidably positioned in said angularly disposed passageways, each of said jaws having a tool engaging face formed on one side thereof and threads formed on an opposite outer surface;
   c) a nut rotatably mounted on said body member and in engagement with said threads on said jaws;
   d) a sleeve member in driving engagement with said nut whereby when said sleeve is rotated with respect to said body member, said jaws will be moved thereby; and
   e) a reinforcing nosepiece disposed around at least a portion of said nose section, said nosepiece including a portion engaging said nut to prevent said nut from disengaging the threads on the jaws because of excessive movement in the direction of the nose section.

2. A chuck for use with a manual or powered driver as in claim 1, wherein a portion of said tail section forms a gripping surface adapted to be gripped by a user's hand to maintain said body member in a fixed position while said nut is rotated with respect to said jaws.

3. A chuck for use with a manual or powered driver as in claim 1, wherein said nut is a one-piece nut.

4. A chuck for use with a manual or powered driver as in claim 1, wherein said sleeve is press fitted to said nut.

5. A chuck for use with a manual or powered driver as in claim 4, wherein the outer circumference of said nut is knurled.

6. A chuck for use with a manual or powered driver as in claim 1, wherein said tail section includes an integral enlarged diameter portion, said integral enlarged diameter portion including a thrust ring receiving portion for supporting a thrust ring.

7. A chuck for use with a manual or powered driver as in claim 1, and further including a bearing assembly located between said tail section and said nut.

8. A chuck for use with a manual or powered driver as in claim 7, wherein said bearing assembly includes a cage, said cage including a portion for surrounding the outside circumference of said thrust ring.

9. A chuck for use with a manual or powered driver as in claim 1, wherein said tail section includes an internally threaded insert for mating with threaded spindle of said driver.

10. A chuck for use with a manual or powered driver as in claim 1, wherein said tail section includes threads integrally molded therewith for engagement with threads on the spindle of the driver.

11. A chuck for use with a manual or powered driver as in claim 1, wherein said integrally molded body member is molded from plastic.

12. A chuck for use with a manual or powered driver as in claim 1, wherein said integrally molded body member is molded from glass filled nylon.

13. A chuck for use with a manual or powered driver as in claim 1, wherein said integrally molded body member is molded from zinc.

14. A chuck for use with a manual or powered driver as in claim 1, wherein said integrally molded body member is molded from metal.

15. A chuck for use with a hand or powered driver having a rotatable drive shaft, said chuck comprising:
   a) an integrally molded body member having a nose section and a tail section, said nose section having an axial bore formed therein and a plurality of angularly disposed passageways formed therethrough and intersecting said axial bore, said nose section having a reinforcing member co-molded therewith about at least a portion of its outer circumference;
   b) plurality of jaws slidably positioned in said angularly disposed passageways, each of said jaws having a tool engaging face formed on one side thereof and threads formed on an opposite outer surface;
   c) a nut rotatably mounted on said body member in engagement with said threads on said jaws;
   d) a sleeve member in driving engagement with said nut whereby when said sleeve is rotated with respect to said body member, said jaws will be actuated thereby; and
   e) a nosepiece extending over said co-molded reinforcing member, said nosepiece including a nut engagement portion for preventing said nut from moving in the forward direction an amount that would allow the nut threads to disengage from the jaw threads.

16. A chuck for use with a hand or powered driver as in claim 15, wherein said sleeve member and nut are co-molded together.

17. A chuck for use with a hand or powered driver as in claim 15, wherein each of said jaws has a substantially polygonal cross-section with respect to the longitudinal axis of said jaw.

18. A chuck for use with a hand or powered driver as in claim 17, wherein said cross-section is substantially rectangular.

19. A chuck for use with a hand or powered driver as in claim 15, wherein each of said passageways has a substantially non-circular cross-section with respect to the longitudinal axis of said passageway.

20. A chuck for use with a hand or powered driver as in claim 15, and further including an internally threaded insert in the tail section for mating with the spindle of a driver.

21. A chuck for use with a hand or powered driver as in claim 20, wherein said insert includes a socket portion adapted to receive a driving tool for assembling said chuck to the spindle.

22. A chuck for use with a hand or powered driver as in claim 21, wherein said socket portion forms a star-shaped receiving area.

23. A chuck for use with a manual or powered driver having a rotatable drive shaft, said chuck comprising:
  a) an integrally molded body member having a nose section and a tail section, said nose section having an axial bore formed therein and a plurality of angularly disposed passageways formed therethrough and intersecting said axial bore;
  b) a plurality of jaws slidably positioned in said angularly disposed passageways, each of said jaws having a jaw face formed on one side thereof and threads formed on an opposite outer surface;
  c) a nut rotatably mounted on said body member and in engagement with said threads on said jaws;
  d) a sleeve member in driving engagement with said nut whereby when said sleeve is rotated with respect to said body member, said jaws will be rotated thereby; and
  e) a reinforcing member pressed over said nose section of said body and extending substantially the entire distance from the forwardmost portion of the nose section to the area where the passageways intersect said axial bore, said reinforcing member including a portion engaging said nut to prevent said nut from disengaging the threads on the jaws because of excessive movement in the direction of the nose section.

24. A chuck for use with a manual or powered driver as in claim 23, wherein said nut has a plurality of drive dog receiving portions and said sleeve has a plurality of drive dogs for engagement with said drive dog receiving portions.

25. An improved chuck for a manual or powered driver, said drill chuck comprising
  a) a body member having an axial bore and a plurality of angularly disposed passageways formed therethrough and intersecting said axial bore, wherein each of said passageways has an enclosed, substantially non-circular cross-section with respect to the longitudinal axis of said passageway;
  b) a plurality of jaws slidably positioned in said passageways, each jaw including a tool engaging portion and threads on an opposite outer surface, each of said jaws having a substantially polygonal cross-section with respect to the longitudinal axis of said jaw; and
  c) a mechanism for actuating said jaws to cause said jaws to hold and release a tool therebetween.

26. An improved body for a chuck, said body comprising:
  a) a molded forward body section having an axial bore and a plurality of angularly disposed jaw receiving passageways formed therethrough and intersecting said axial bore, each of said passageways having an enclosed non-circular cross-section with respect to the longitudinal axis of said passageway; and
  b) a rearward body section having a portion for mounting to the spindle of a drill or driver, said rearward section being integrally molded with said forward section.

27. A chuck for use with a manual or powered driver having a rotatable drive shaft, said chuck comprising:
  a) an integrally molded body member having a nose section and a tail section, said nose section having an axial bore formed therein and a plurality of angularly disposed passageways formed therethrough and intersecting said axial bore, and said tail section forming a multi-lobal gripping surface adapted to be gripped by a user's hand to maintain said body member in a fixed position while said nut is rotated with respect to said jaws;
  b) a plurality of jaws slidably positioned in said angularly disposed passageways, each of said jaws having a tool engaging face formed on one side thereof and threads formed on an opposite outer surface;
  c) a nut rotatable mounted on said body member and in engagement with said threads on said jaws; and
  d) a sleeve member in driving engagement with said nut whereby when said sleeve is rotated with respect to said body member, said jaws will be moved thereby.

28. A chuck for use with a manual or powered driver as in claim 1, wherein said axial bore includes a non-circular internal configuration along its length.

29. A chuck for use with a manual or powered driver having a rotatable drive shaft, said chuck comprising:
  a) an integrally molded body member having a nose section and a tail section, said nose section having an axial bore formed therein and a plurality of angularly disposed passageways formed therethrough and intersecting said axial bore, each of said passageways defining an enclosed non-circular cross-section with respect to the longitudinal axis of said passageway;
  b) a plurality of jaws slidably positioned in said angularly disposed passageways, each of said jaws having a tool engaging face formed on one side thereof and threads formed on an opposite outer surface;
  c) a nut rotatably mounted on said body member and in engagement with said threads on said jaws;
  d) a sleeve member in driving engagement with said nut whereby when said sleeve is rotated with respect to said body member, said jaws will be moved thereby.

30. A chuck for use with a manual or powered driver as in claim 29, wherein said each said passageway defines a polygonal said cross-section.

31. A chuck for use with a manual or powered driver as in claim 25, wherein each said jaw defines a polygonal said cross-section.

32. A chuck for use with a manual or powered driver having a rotatable drive shaft, said chuck comprising:
  a) an integrally molded body member having a nose section and a tail section, said nose section having an axial bore formed therein and a plurality of angularly disposed passageways formed therethrough and intersecting said axial bore;
  b) a plurality of jaws slidably positioned in said angularly disposed passageways, each of said jaws having a tool engaging face formed on one side thereof and threads formed on an opposite outer surface;
  c) a nut rotatably mounted on said body member and in engagement with said threads on said jaws;
  d) a sleeve member in driving engagement with said nut whereby when said sleeve is rotated with respect to said body member, said jaws will be moved thereby, and
  e) a retention band mounted about said body member forward of and in communication with said nut to axially retain said nut in the forward direction on said body member, wherein said nose section extends forward of said retention band.

33. The chuck as in claim 32, wherein said band is pressed to said body member.

34. The chuck as in claim 32, wherein said sleeve member is disposed between said band and said nut so that said band communicates with said nut through said sleeve member.

35. The chuck as in claim 34, wherein said sleeve member forms and annular shoulder extending between said band and said nut.

36. The chuck as in claim 32, wherein said sleeve member surrounds and extends forward of said band so that said sleeve entirely covers said band.

37. The chuck as in claim 32, wherein said sleeve member is press fitted to said nut.

38. The chuck as in claim 32, further including a bearing assembly located between said tail section and said nut.

39. The chuck as in claim 32, wherein said tail section includes an internally threaded insert for mating with a threaded spindle of said driver.

40. The chuck as in claim 32, wherein said tail section includes threads integrally molded therewith for engagement with threads on the spindle of the driver.

41. The chuck as in claim 32, wherein said integrally molded body member is molded from plastic.

42. The chuck as in claim 32, wherein said integrally molded body member is molded from glass filled nylon.

43. The chuck as in claim 32, wherein said integrally molded body member is molded from metal.

44. A chuck for use with a manuel or powered driver having a rotatable drive shaft, said chuck comprising:
 a) an integrally molded body member having a nose section and a tail section, said nose section having an axial bore formed therein and a plurality of angularly disposed passageways formed therethrough and intersecting said axial bore;
 b) a plurality of jaws slidably positioned in said angularly disposed passageways, each of said jaws having a tool engaging face formed on one side thereof and theads formed on an opposite outer surface;
 c) a nut rotatably mounted on said body member and in engagement with said threads on said jaws;
 d) a retention band mounted about said body member forward of and in communication with said nut to axially retain said nut in the forward direction on said body member, wherein said nose section extends forward of said retention band; and
 e) a sleeve in driving engagement with said nut whereby when said sleeve is rotated with respect to said body member, said jaws will be moved thereby, wherein said sleeve member surrounds and extends forward of said band and is disposed between said band and said nut so that said band communicates with said nut through said sleeve member.

45. The chuck as in claim 44, wherein said sleeve member forms and annular shoulder extending between said band and said nut.

46. The chuck as in claim 45, wherein said integrally molded body member is molded from plastic.

47. The chuck as in claim 45, wherein said integrally molded body member is molded from glass filled nylon.

48. A chuck for use with a manual or powered driver having a rotatable drive shaft, said chuck comprising:
 a) an integrally molded body member having a nose section and a tail section, said nose section having an axial bore formed therein and a plurality of angularly disposed passageways formed therethrough and intersecting said axial bore;
 b) a plurality of jaws slidably positioned in said angularly disposed passageways, each of said jaws having a tool engaging face formed on one side thereof and threads formed on an opposite outer surface and having a substantially polygonal cross-section with respect to the longitudinal axis of said jaw;
 c) a nut rotatably mounted on said body member and in engagement with said threads on said jaws;
 d) a sleeve member in driving engagement with said nut whereby when said sleeve is rotated with respect to said body member, said jaws will be moved thereby; and
 e) a retention band mounted about said body member forward of and in communication with said nut to axailly retain said nut in the forward direction on said body member, wherein said nose section extends forward of said retention to band.

49. The chuck as in claim 44, wherein each said passageway has a substantially non-circular cross-section with respect to the longitudinal axis of said passageway.

50. The chuck as in claim 48, wherein said cross-section is substantially rectangular.

* * * * *

UNITED STATES PATENT AND TRADEMARK OFFICE
CERTIFICATE OF CORRECTION

PATENT NO. : 6,045,141
DATED : April 4, 2000
INVENTOR(S) : Kevin C. Miles and Ian Middleton It is certified that error appears in the above-identified patent and that said Letters Patent is hereby corrected as shown below:

Column 16,
Line 36, after the phrase "of said retention" please delete to word "to".

Signed and Sealed this

Third Day of May, 2005

JON W. DUDAS
*Director of the United States Patent and Trademark Office*